United States Patent [19]

Bilz

[11] 4,041,729

[45] Aug. 16, 1977

[54] OVERLAND COUPLING DEVICE

[75] Inventor: Reiner Bilz, Stuttgart, Germany

[73] Assignee: Otto Bilz Werkzeugfabrik, Ostfildern, Germany

[21] Appl. No.: 661,168

[22] Filed: Feb. 25, 1976

[30] Foreign Application Priority Data

Mar. 14, 1975  Germany .............................. 2511148

[51] Int. Cl.² ............................................... F16D 3/56
[52] U.S. Cl. .................................. 64/29; 81/52.4 R; 192/56 R
[58] Field of Search ........................... 64/29; 192/56; 81/52.4 A, 52.4

[56] References Cited

U.S. PATENT DOCUMENTS

| 2,263,709 | 11/1941 | van Sittert | 81/52.4 R |
| 2,631,696 | 3/1953 | Yarber | 64/29 |
| 2,957,323 | 10/1960 | Elliott et al. | 64/29 |
| 3,001,430 | 9/1961 | Cranford | 81/52.4 R |
| 3,552,147 | 1/1971 | Johansson et al. | 64/29 |
| 3,827,260 | 8/1974 | Kato | 64/29 |

Primary Examiner—Samuel Scott
Assistant Examiner—Randall Heald
Attorney, Agent, or Firm—Michael J. Striker

[57] ABSTRACT

An overload coupling device has a drive shank, a drive sleeve for driving the drive shank, a closure sleeve surrounding the drive sleeve and a thrust ring. The shank and sleeves is provided with apertures containing balls and the thrust ring is urged by a spring to normally hold the balls in the apertures of the drive shank and drive sleeve to provide a driving connection therebetween but allows the balls to slide in the apertures of the drive sleeve and into the apertures of the closure sleeve to release the driving connection in the event of torque overload.

29 Claims, 6 Drawing Figures

OVERLAND COUPLING DEVICE

BACKGROUND OF THE INVENTION

1. Field of the Invention.

This invention relates to an overload coupling device for thread-cutter chucks or quick-change inserts therefor. Such an overload coupling comprises a cylindrical drive sleeve loadable with the rotational drive moment, a drive shank drivable by means of the drive sleeve and held coaxially and rotatably within the latter, a mounting for the rotation-fast retention of a tap drill and a torque coupling seated in the force flux between drive sleeve and drive shank. The torque coupling has an adjustable tripping torque and is formed as a spring-loaded ball-pocket coupling with one or more coupling balls. The drive sleeve is axially non-displaceably held on the drive shank and has on one axial end face openings open in the axial direction, corresponding to the number of coupling balls and serving each for the reception of one coupling ball, the width of which openings is at least as great as the coupling ball diameter. The drive shank in the axial region of the openings comprises ball pockets corresponding to the number of coupling balls, arranged at preferably equal angular intervals from one another in the peripheral direction, depressed in spherical segment form or formed as bores, with diameter smaller than the diameter of the coupling balls, for the reception of the coupling balls. Such overload coupling devices are intended either for quick-change thread-cutter chucks, in which they are constructionally integrated, or for separate quick-change inserts which in turn can be received interchangeably in such quick-change thread-cutter chucks.

2. Description of the Prior Art.

The overload coupling devices with torque coupling form safety couplings between the drive, which in the case of quick-change thread-cutter chucks inserted into a machine tool is provided on the machine and connected to the drive sleeve, and the drive output, that is the drive shank with tap drill held fast in rotation in its mounting. The force transmission from the drive input to the drive output takes place through the torque coupling. This has the task of protecting the driven tap drill against breakage, for example on running on to the bottom of a blind hole or when the tap drill has become blunt and thus higher torque absorption becomes necessary.

Thread-cutter chucks with torque-dependently working overload coupling devices are known in various forms, for example after the style of friction couplings, cam or dog couplings or even so-called ball-pocket couplings. Friction couplings have the disadvantage that on response the set torque drops off only slightly and the tap drill constantly remains under torque loading. Cam or dog couplings have the great disadvantage that on response they slip through from dog to dog, that is attempt suddenly and repeatedly to restore the drive connection, and separate the force flux again in the case of a counter moment lying above the tripping moment, so that the tap drills are subjected to alternating and suddenly acting torque loads, so that the cutting edges of the drills easily break or other drill damage can occur. Moreover considerable spring forces have to be applied, which is expensive and compels relatively large radial and axial dimensions. Various known ball-pocket couplings have substantially the same disadvantages, because in these the coupling balls frequently cannot yield sufficiently easily nor by a sufficient amount and suddenly repeatedly drop back into the position in which the drive connection is restored. Above all known ball-pocket couplings are subjected to considerable friction wear especially on account of the periodic re-coupling, especially if the smallest possible diameter of the chuck and/or insert is sought. Moreover the relatively complicated assembly of such ball-pocket couplings, which thus are very expensive, is disadvantageous. Their response behavior is also unsatisfactory, because inexact and unreliable, for the coupling balls frequently cannot yield with certainty or at least with sufficient certainty, so that there is no defined response threshold but a relatively wide response range.

SUMMARY OF THE INVENTION

The object of this invention is to provide an overload coupling device for thread-cutter chucks or quick-change inserts for these which is simple and cheap in assembly, permits small axial and especially radial dimensions, works with low wear and reliably and precisely as regards the response behavior, and which on reaching the tripping moment durably and reliably effects a separation from the drive.

According to this invention the openings are formed as cage slots which are inwardly and outwardly open in the radial direction and the axial extent of which is less than the coupling ball diameter, the cage slots are placed with inclination in relation to the working drive direction of the drive sleeve. The ball-pockets are arranged on the outer peripheral surface, facing the drive sleeve, of the drive shank. A cylindrical closure sleeve coaxially enclosing the drive sleeve and the drive shank is axially nondisplaceably held on the drive sleeve, which closure sleeve possesses in the axial region of the cage slots an annular groove in the interior, the groove bottom of which extends with a radial distance from the peripheral surface of the drive shank at least corresponding to the coupling ball diameter. In the annular space between drive shank and closure sleeve on the axial side of the coupling balls facing away from the bottom of the cage slots a thrust ring is arranged which is pressable axially in the direction towards the cage slots and against the coupling balls by means of thrust springs supported adjustably on the closure sleeve. In this case even only one coupling ball can be adequate. If on the other hand several are provided, then they are arranged at equal angular intervals from one another in the peripheral direction.

Thus the object is achieved that in the case of a counter-moment on the tap drill lying below the tripping moment the coupling balls remain within their coupling pockets, so that force is transmitted from the drive sleeve through the cage slots to the coupling balls and thence through the ball-pockets to the drive shank with tap drill held fast in rotation in the mounting. In this case in accordance with the direction of rotation of the working drive movement the associated regions of the walls of the cage slots in each case are in abutment contact with the coupling balls, so that these wall regions push the coupling balls before them in the peripheral direction. This and the spring force with which the thrust ring is pressed axially upon the coupling balls hold the coupling balls in this coupled position. If the counter-moment on the tap drill exceeds the set tripping moment, then the coupling balls are pressed by means of the wall regions of the cage slots abutting on them out of the ball-pockets against the spring-loading of the thrust ring. The coupling balls roll outwardly in the cage slots along a path corresponding to the inclination of the cage slots, on the wall region of the cage slots which pushes them before it, until they emerge completely from the ball-pockets and have yielded into the annular groove of the closure sleeve. The coupling balls reliably remain in this disengaged position as a result of the configuration of the inclined cage slots and under the greater spring-loading acting axially through the thrust ring as a result of the axial displacement of the thrust ring and of the greater compression of the thrust springs. No axial movement of the coupling balls here takes place, but a pure movement occurs within a diametrical plane containing the ball center points, from the ball-pockets to the annular groove. If the drive-rotating movement of the drive sleeve is still present the coupling balls roll on the peripheral surface of the drive shank, which is now stationary in relation thereto, and on the annular groove. For the screwing out of the tap drill in a rotation direction contrary to the working drive direction, the coupling balls are automatically pushed in the direction towards and into the ball-pockets by means of the other inclined wall of the cage slots, the thrust springs of the thrust ring being correspondingly relieved. A constrained entraining takes place as a result of the inclination of the cage slots in the direction of this return rotation, by which the coupling balls are reliably prevented from wandering out.

The device according to the invention is simple in assembly and therefore cheap and operationally reliable. It renders possible an accurate and reproducible response of the torque coupling. In response and in the disengaged coupling condition the friction wear is extraordinarily low. The spring forces to be applied by the thrust springs can be made relatively small. In the disengaged and uncoupled condition the coupling balls reliably remain in the disengaged position in which they completely and durably release the drive shank for a rotation in relation to the drive sleeve. The possibility of the disengaged coupling balls briefly re-entering the ball-pocket and being pushed out of it again every time a cage slot of the drive sleeve passes a ball-pocket in the rotating movement is precluded. The possibility of occurrence of impact loading of the tap drill is thus likewise precluded. The arrangement further permits very small axial and radial dimensions.

The cage slots can be placed at an inclination to a line parallel with the longitudinal central axis of the drive sleeve. Instead or in addition the inclination of the cage slots can also extend within a diametrical plane, the cage slots extending obliquely in relation to a diameter. In the latter case in one advantageous form of embodiment it is provided that the two walls of each cage slot, which are opposite to one another at the slot width, extend substantially parallel with one another and are planar in the axial direction and aligned parallel with the longitudinal central axis of the drive sleeve and of the drive shank. It can be advantageous if the two mutually opposite walls of each cage slot, considered in a diametrical plane at right angles to the longitudinal central axis, in each case extend along a secant of the peripheral circle of the drive shank and of the drive sleeve and parallel with spacing to and from a diameter. Both walls of each cage slot in advantageous further development extend, considered in a diametric plane at right angles to the longitudinal central axis, with inclination towards the working drive direction of the drive sleeve. This inclination of the cage slots and the fact that the diameter of the ball-pockets is smaller than the diameter of the coupling balls received therein, that is the latter lie with their center points with spacing outside the peripheral surface of the drive shank, guarantees that in the case of a counter-torque on the tap drill lying above the set tripping moment the coupling balls are suddenly forced by means of the pushing wall region of the cage slots out of the ball-pocket and pushed within the diametrical plane into the annular groove, while equally suddenly the thrust ring is displaced axially against the thrust springs and securely holds the coupling balls in the disengaged and uncoupled position. Thus a precise and reproducible response threshold with relatively great accuracy of response is obtained in place of relatively wide response ranges.

In a further advantageous embodiment of the invention the projection of the slot width of the cage slot on to the peripheral surface of the drive shank, when a coupling ball is situated in the associated ball-pocket, is offset in the working drive direction of the drive sleeve in the peripheral direction in relation to the associated ball-pocket, in such a way that one of the walls of the cage slot extends with spacing from the coupling ball and out of contact therewith and the opposite wall of this cage slot abuts on the coupling ball with a narrow corner region closely adjacent to the ball-pocket. In this case as corner region a narrow edge on the associated end of the wall of the cage slot can be adequate. This relatively narrow edge here expediently lies at the point where the coupling ball protrudes from the ball-pocket. Thus the edge lies directly adjacent to the outer marginal edge of the ball-pocket, that is the zone where the ball-pocket merges into the peripheral surface of the drive shank. It can be advantageous if the corner region comprises a contact section approximately parallel with the diameter which crosses the longitudinal central axis and contains the center point of the coupling ball, which section abuts tangentially on the coupling ball. Thus substantially the same is ensured, but any possible wear in the corner region or on the coupling ball is avoided as a result of the tangential contact at the point which pushes the coupling ball before it. The contact section terminates with its end facing the ball-pocket approximately at the level of the upper marginal edge of the ball-pocket, then extends outwards parallel with the above-mentioned diameter and then emerges into the oblique wall. It can also be advantageous if the corner region lies on the peripheral circle which is greater than the peripheral circle describing the outer peripheral surface of the drive shank, and on which the center points of the coupling balls situated in the associated ball-pockets substantially lie.

In a further advantageous embodiment of the invention the bisector of the slot width of a cage slot, extending parallel with the walls of the cage slot, when a coupling ball is situated in the associated ball-pocket, extends in the working drive direction with spacing from the center point of the ball, and that when the coupling ball has wandered out of the associated ball-pocket the ball center point lies on the bisector. Thus in combination with the above-mentioned tangential contact section the object is achieved that when the tripping moment is reached the coupling ball is pushed by the tangential contact section approximately in the working drive direction out of the ball-pocket. Then the coupling ball rolls over the contact section and then on the adjoining wall of the cage slot, the distance between the coupling ball and the other opposite wall of this cage slot reducing continuously until the coupling ball lies completely in the cage slot.

It can be advantageous if the angle enclosed between a diameter which intersects the longitudinal central axis and contains the ball center point of a coupling ball and one wall of the cage slot is an acute angle. Thus the cage slot is set obliquely towards the working drive direction by this angle in relation to the radius passing through the ball center point. It can be advantageous if the slot width, measured in a diametrical plane at right angles to two mutually opposite walls of the cage slot, approximately corresponds to the diameter of a coupling ball.

In a further advantageous embodiment of the invention the end face of the thrust ring facing the coupling balls has a frustoconical inner thrust face with cone apex directed contrarily of the thrust direction and that the frustoconical thrust face merges at the end face of the thrust ring facing the coupling balls into a plane retaining face at right angles to the longitudinal central axis. Here the arrangement is made such that the thrust ring is resiliently pressable against the coupling balls with its frustoconical thrust face when the coupling balls are situated in the ball-pockets and with its plane retaining face when the coupling balls have travelled radially out of the ball pockets. The frustoconical thrust face firstly in the case of very small spring forces achieves a reliable retention of the coupling balls in the ball-pockets as a result of the radial component of the obliquity. When the tripping moment is reached the thrust ring is displaced axially against the thrust springs by the outwardly travelling coupling balls through the oblique thrust face with relatively low wear level, also easily and quickly, while when the coupling balls assume their disengaged end position a sudden transition takes place from abutment with the oblique thrust face to abutment with the plane retaining face, by means of which the coupling balls are held securely in the disengaged position. Thus the transition takes place suddenly, while likewise exact disengagement is achieved when the counter-moment lies above the tripping moment. On re-engagementof the coupling balls the oblique thrust face has an accelerating action, as a result of the radial force component, upon the re-engagement which thus likewise takes place suddenly. This configuration permits lower spring forces, that is the use of softer and smaller thrust springs.

The drive sleeve can preferably comprise on its face remote from the cage slots two mutually diametrically opposite axially projecting drive dogs. By means of the drive dogs, in the case of configuration as quick-change insert, the drive movement can be derived from the quick-change thread-cutter chuck and transmitted to the drive sleeve.

In a further advantageous embodiment of the invention the arrangement is made in such manner that the drive sleeve is axially non-displaceably held on the drive shank in an axial direction opposite to the thrust direction of the thrust springs by means of an inner annular collar formation protruding radially from the drive shank, and that the closure sleeve in turn is axially non-displaceably held on the drive sleeve by means of an approximately corresponding radial annular collar formation in the same direction. At the end of the closure sleeve remote from the drive sleeve an adjusting ring can be arranged in the annular space between the closure sleeve and the drive shank, which ring is screwed by means of external threading into an internally threaded portion of the closure sleeve and held non-rotatably in relation to the closure sleeve by means of a rotation-securing device. As thrust springs there can be provided dished springs which are arranged in the annular space between closure sleeve and drive shank and clamped in the axial direction between thrust ring and adjusting ring, according to the rotational position of the latter. This configuration is simple and cheap and leads to small axial and radial dimensions, irrespective of whether in a chuck or in an insert for the latter.

The rotation-securing device can consist firstly of an annular spring held in a peripheral groove of the closure sleeve, with an end bent over into the radial direction, which engages through a radial passage opening of the closure sleeve in the adjusting ring.

Furthermore for security against rotation on the outer periphery of the adjusting ring there can be provided a plurality of axial, peripherally open longitudinal slots arranged at equal angular intervals from one another in the peripheral direction, in which slots the end of the annular spring engages in securing manner. The thrust ring is expediently held non-rotatably but axially displaceably and radially centred in relation to the drive shank. The non-rotatability of the thrust ring in relation to the drive shank ensures that the coupling balls can rotate in re-coupling so that thus they abut on the one wall of the cage slot by way of which the coupling balls are pushed into the ball-pockets. For this purpose the thrust ring can preferably have on its inner peripheral surface three axial grooves arranged at equal angular intervals from one another in the peripheral direction, in each of which a retaining and centring ball engages which is held on the drive shank in an associated depression of the external peripheral surface. In this way the thrust ring is secured against rotation in relation to the drive shank, centered in relation to the longitudinal central axis and nevertheless displaceable easily by rolling in the axial direction in relation to the drive shank.

BRIEF DESCRIPTION OF THE DRAWING

FIG. 4 shows an enlarged detail of FIG. 3a; and

DESCRIPTION OF THE PREFERRED EMBODIMENT

Figure 1:
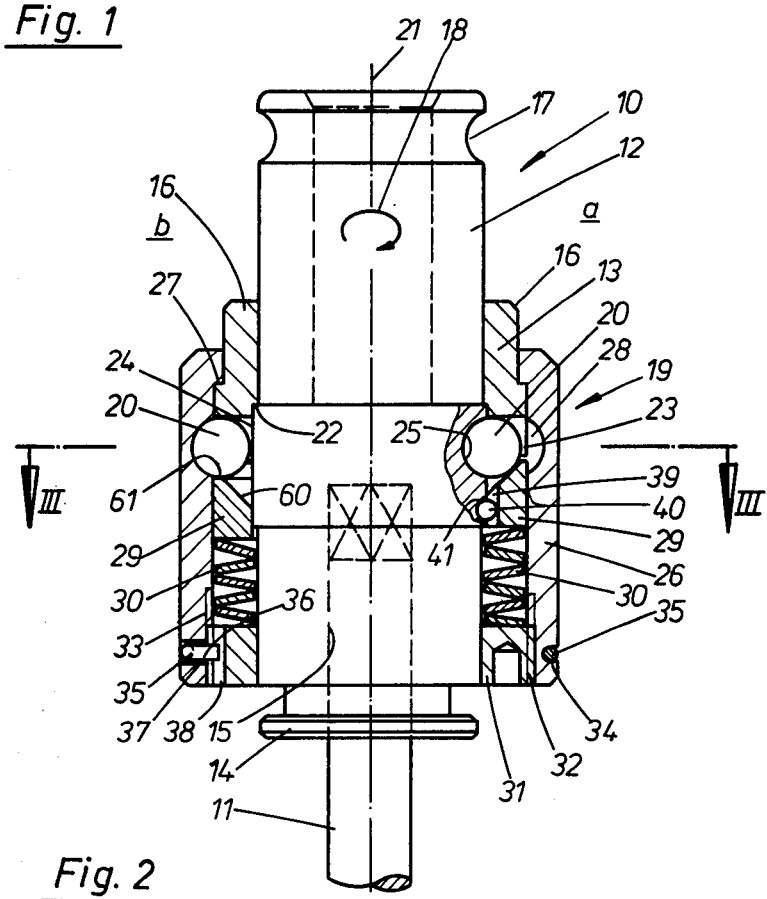
FIG. 1 shows an axial longitudinal section of the thread-cutter insert (without chuck), namely in the coupled condition (a) on the right of the longitudinal central axis and in the uncoupled condition (b) on the left of the longitudinal central axis.
Figure 2:
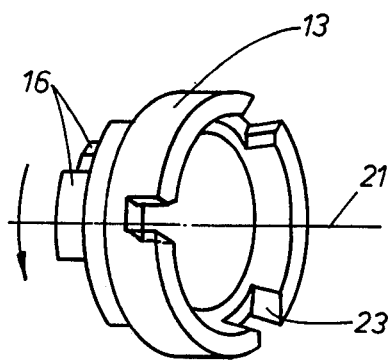
FIG. 2 shows a perspective view of the drive sleeve of the insert in FIG. 1.

The quick-change insert 10 for a tap drill 11 has a cylindrical drive shank 12 and a cylindrical drive sleeve 13 coaxial with and rotatable in relation to the drive shank 12. The drive shank 12 has a mounting for the rotation-fast retention of the tap drill 11 in the region of the lower end in the illustration in FIG. 1. The mounting here consists of a spring-loaded clamping bush 14 and a square section socket 15 (indicated in dashed lines) formed in the interior of the drive shank 12. On its upper end face in the illustration according to FIG. 1 the drive sleeve 13 carries two mutually diametrically opposite axially projecting drive dogs 16. The insert 10 is insertable with the upper end, which is of the conventional configuration, into an associated quick-change chuck (not shown) for thread cutting, while locking bodies present in the chuck snap automatically into a peripheral groove 17 at the upper end of the drive shank 12 for axially securing the insert 10 and the two drive dogs 16 come into torque-transmitting engagement with the chuck. On rotation of this chuck the drive sleeve 13 receives the drive moment through the drive dogs 16. The working drive direction of the insert 10 is indicated by the arrow 18 in FIG. 1 and in FIGS. 3a and 3b. The working direction of rotation is in the clockwise direction.

Between drive sleeve 13 and drive shank 12 there is seated a torque coupling with adjustable tripping torque, formed as ball-pocket coupling 19. The ball-pocket coupling 19 is spring-loaded and has three coupling balls 20 arranged at equal angular intervals from one another in the peripheral direction. In the illustration according to FIG. 1 on the right of the longitudinal central axis 21 and in the illustration according to FIG. 3a the coupling 19 is shown in the coupled condition (a) and on the left of the longitudinal central axis 21 in FIG. 1 and in FIG. 3b it is shown in the uncoupled condition (b).

On the drive shank 12 the drive sleeve 13 is held nondisplaceably in an axial direction corresponding to the arrows III by means of an inner annular shoulder 22 protruding radially in relation to the drive shank 12. On the axial end face opposite to the two drive dogs 16 the drive sleeve 13 comprises cage slots 23 provided in accordance with the number of the coupling balls 20 and serving for their reception. These slots are open in the axial and radial directions. Their axial extent is less than the diameter of a coupling ball 20, so that the coupling balls 20 protrude within the cage slots 23 in the axial direction, as indicated by the arrows III, beyond the end face of the drive sleeve 13. The width of the cage slots 23 is at least as great as the diameter of the coupling balls 20. The cage slots 23 are placed at an inclination towards the working drive direction (arrow 18) of the drive sleeve 13.

In the axial region of the cage slots 23 the drive shank 12 possesses on its outer peripheral surface 24 facing the drive sleeve 13 three ball-pockets 25 arranged at equal angular distances from one another in the peripheral direction, which pockets are shaped as pad spherical hollows and have a smaller depth than the radius of the coupling balls 20. The ball-pockets 25 are intended to receive the coupling balls 20 in the coupled position. Instead the ball-pockets 25 can also be formed, as not shown further, by radial bores the bore diameter of which is smaller than the diameter of the balls 20. On the drive sleeve 13 a cylindrical closure sleeve 26, which is longer in the axial direction, is axially non-displaceably held. The closure sleeve 26 encloses the drive sleeve 13 and the drive shank 12 coaxially and is held by means of a radial annular collar 27 on the drive sleeve 13 axially non-displaceably, in the same direction as the latter. In the axial region of the cage slots 23 the closure sleeve 26 has an annular groove 28 in the interior. The bottom of the annular groove 28 extends radially from the peripheral surface 24 of the drive shank 12 by a distance equal at least to the diameter of the coupling ball 20. In the annular space between drive shank 12 and closure sleeve 26 on the axial side of the coupling balls 20 lying opposite to the drive dogs 16 a thrust ring 29 is arranged. The thrust ring 29 is pressable axially in the direction towards the cage slots 23 and against the coupling balls 20 by means of compression springs 30 formed as belleville washers, and adjustably supported on the closure sleeve 26. For this purpose on the end of the closure sleeve 26 remote from the drive sleeve 13, in the annular space between the closure sleeve 26 and the drive shank 12 an adjusting ring 31 is arranged. The ring 31 is screwed by means of external threading 32 into an internally threaded section 33 of the closure sleeve 26 and held non-rotatably in relation to the closure sleeve 26 by means of a rotation-securing device. The adjusting ring 31 acts in the axial direction upon the thrust springs 30 which are braced in between the ring 31 and the thrust ring 29.

The rotation-securing device comprises an annular spring 35, held in a peripheral groove 34 of the closure sleeve 26, with a bent-over end 36 which engages with the adjusting ring 31 through a radial passage opening 37 of the closure sleeve 26. The rotation-securing device also comprises on the external periphery of the adjusting ring 31 a plurality of axial longitudinal slots 38 open to the periphery and provided at equal angular intervals from one another in their peripheral direction, in which the end 36 of the annular spring 35 can engage in securing manner.

The thrust ring 29 preferably possesses three axial grooves 39 arranged at equal angular distances from one another in the peripheral direction on its inner peripheral surface, in each of which a retaining and centering ball 40 engages. Each ball 40 is held on the drive shank 12 in an associated depression 41 of the outer peripheral surface. Thus the thrust ring 29 is held non-rotatably but axially rollingly displaceably and radially centred in relation to the drive shank 12.

Special details of the configuration of the cage slots 23 and of the thrust ring 29 are explained hereinafter, reference being made in each case especially to FIGS. 4 and 5.

Figure 3A:
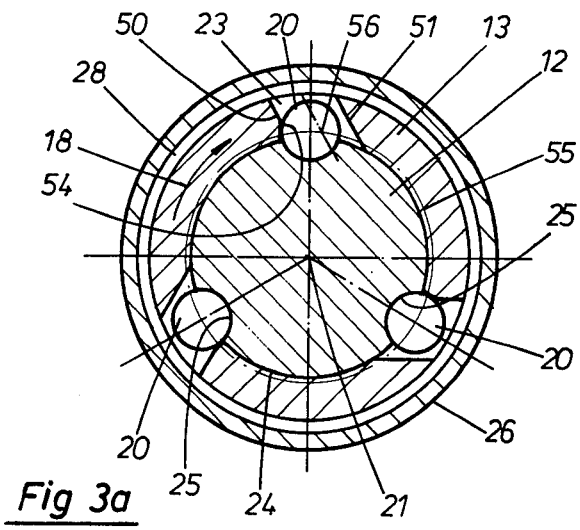
FIGS. 3a and 3b each show a section along the line III—III in FIG. 1, namely in the coupled and uncoupled condition respectively.
Figure 4:
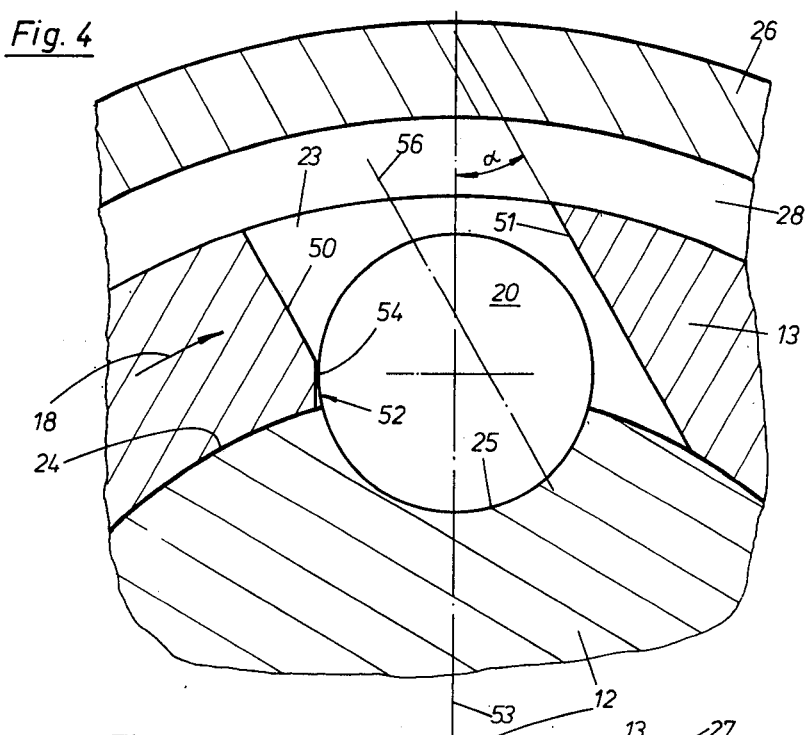

FIG. 4 shows that the two walls 50, 51 of each cage slot 23, standing opposite to one another at the slot width, extend substantially parallel to each other and furthermore are shaped as planes extending in the axial direction and parallel with the longitudinal central axis 21 of the drive sleeve 13 and of the drive shank 12. Seen in a diametric plane at right angles to the longitudinal central axis 21, the walls 50, 51 in each case extend along a secant of the peripheral circle of the drive shank 12 and of the drive sleeve 13 and thus parallel to and with spacing from a diameter. FIG. 4 shows that the two walls 50, 51, seen within the said diametric plane, have a course inclined towards the working drive direction according to the arrow 18 of the drive sleeve 13. The arrangement is such that the projection of the slot width of each cage slot 23 upon the peripheral surface 24 of the drive shank 12, when the coupling ball 20 is situated in the ball-pocket 25 — coupled condition (a) in FIG. 1 on the right and FIG. 3a also FIGS. 4 and 5 — is offset in the working drive direction (arrow 18) of the drive sleeve 13 in the peripheral direction in relation to the associated ball-pocket 25, namely in such a way that the one wall 51 of the cage slot 23 in this coupled condition extends at a distance from the coupling ball 20 and out of contact therewith and the opposite wall 50 of this cage slot 23 abuts with a narrow corner region 52 closely adjacent to the ball-pocket 25 on the coupling ball 20. The corner region 52 has a contact section 54 approximately parallel with the diameter 53 which intersects the longitudinal central axis 21 and passes through the center point of the coupling ball 20, which section 54 in the coupled condition abuts tangentially on the periphery of the coupling ball 20. It can be seen that the corner region 52 lies substantially on a peripheral circle 55 (dot-and-dash lines in FIG. 3a) which is larger than the peripheral circle describing the outer peripheral surfaces 24 of the drive shank 12 and upon which the center points of the coupling balls 20 lie approximately when in the coupled condition. The contact section 54 terminates at its end facing the ball-pocket 25 approximately at the level of the upper marginal edge of the ball-pocket 25, then extends outwards parallel with the diameter 53 and then merges into the oblique wall 50. If instead the corner region 52 is a narrow edge approximately of knife-edge type, then it expediently lies at the point where the coupling ball 20 protrudes from the ball-pocket 25. Thus this edge lies directly adjacent to the outer marginal edge of the ball-pocket 25.

Figure 3B:
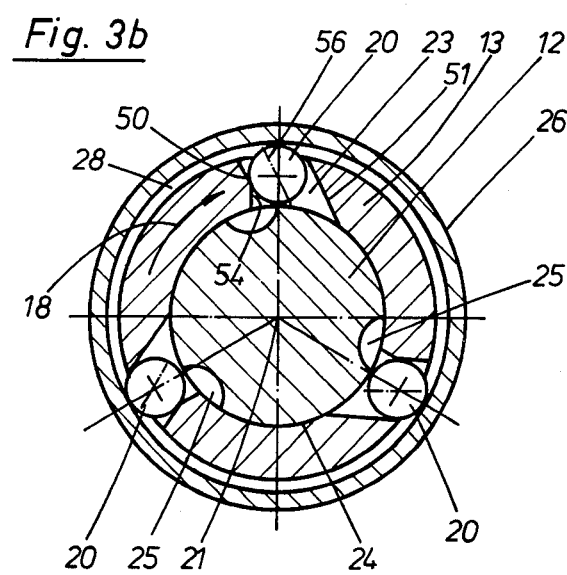

FIGS. 3a, 3b and 4 show that the bisector 56 of the slot width of a cage slot 23, extending parallel with the walls 50, 51, extends at a distance from the ball center point in the working drive direction (arrow 18) when the coupling ball 20 is situated in the ball-pocket 25 (coupled condition according to FIG. 3a). On the other hand when the coupling ball 20 has travelled out of the ball-pocket 25 (uncoupled condition according to FIG. 3b) the ball center point lies on this bisector 56. The bisector 56 is indicated in dot-dash lines in each of FIGS. 3a, 3b and 4.

FIG. 4 shows that the angle $\alpha$ included between the diameter 53, which intersects the longitudinal central axis 21 and contains the ball centre point, and the one wall 51 is an acute angle. FIG. 3b shows that the slot width measured at right angles to the walls 50, 51 — considered within the diametric plane containing the ball center points — corresponds to the diameter of the coupling ball 20.

The arrangement is made to that considered in the peripheral direction according to the arrow 18 the wall 51 extending obliquely at the angle $\alpha$ in relation to the diameter 53 terminates at a distance from the upper marginal edge of the ball-pocket 25 on the peripheral surface 24 of the drive shank 12, considered in the coupled condition (FIG. 3a). The other wall 50 extends parallel with the wall 51. Its prolongation in the direction towards the peripheral surface 24 of the drive shank 12 would terminate in the region of the ball-pocket 25. Thus the wall 50 is offset parallel in the direction of the arrow 18 in relation to an imaginary oblique line which would terminate in the region of the upper marginal edge of the ball-pocket 25, in such a way that the obliquity of the wall 50 does not lead to the upper marginal edge of the ball-pocket 25, but terminates at the external periphery of the coupling ball 20 and merges from this corner edge into the contact section 24 which extends parallel to the diameter 53 and rests tangentially on the ball periphery.

Figure 5:
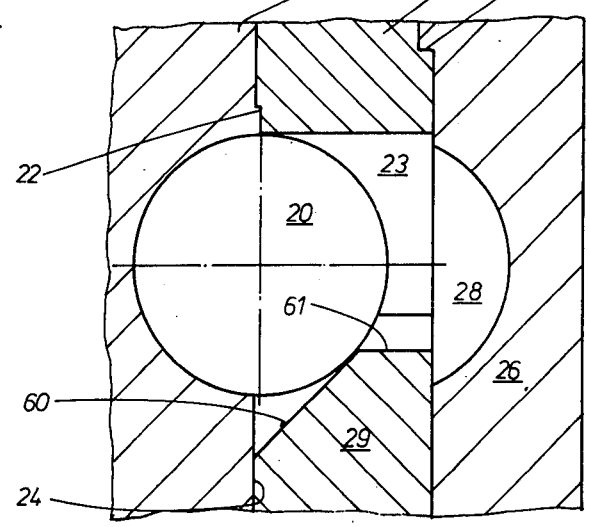
FIG. 5 shows an enlarged detail of FIG. 1 on the right of the longitudinal central axis.

Details of the thrust ring 29 may be seen from FIGS. 1 and 5. The end face of the thrust ring 29 facing the coupling balls 20 has a frustoconical inner thrust face 60 with cone apex directed contrarily of the thrust direction of the thrust springs 30. The thrust face 60 merges at the end face of the thrust ring 29 facing the coupling balls 20 into a plane retaining face 61 at right angles to the longitudinal central axis 21. Therefore the thrust ring 29 is resiliently pressable against the coupling balls 20 with its frustoconical thrust face 60, namely in the region of the transition of the thrust face 60 into the retaining face 61, when the coupling balls are situated in the ball-pockets 25 (coupled condition according to FIG. 1 on the right and FIG. 4). On the other hand when the coupling balls 20 have travelled radially out of the ball-pockets 25 (uncoupled condition according to FIG. 1 on the left and FIG. 3b) the thrust ring is resiliently pressable against the coupling balls 20 with its plane retaining face 61.

The manner of operation of the quick-change insert 10 is explained in greater detail hereinafter. Here the basis is adopted that the insert 10 is fitted into a quick-change thread-cutter chuck (not shown), as initially explained, and the drive movement is conducted from the chuck through the drive dogs 16 to the drive sleeve 13. The tap 11 is held for joint rotation with the clamping bush 14 and socket 15 of the drive shank 12. The working drive direction corresponds to the arrow 18. The initial condition is that in which the ball-pocket coupling 19 is situated in the coupled condition according to FIG. 1 on the right, FIGS. 3a, 4 and 5. The thread-cutting operation takes place in this condition. The coupling balls 20 are here carried within the ball-pockets 25 and held by means of the thrust springs 30 with pre-set spring force in the ball-pockets 25 by means of the thrust ring 29, which presses with its thrust face 60 upon the coupling balls 20. The adjustment of the thrust springs 30 is effected, after lifting out of the end 36 of the annular spring 35, by rotation of the adjusting ring 31, for which purpose appropriate tools can be inserted into two diametrically opposite insertion bores. After the spring force is adjusted, the end 36 is introduced through the passage opening 37 into the longitudinal slot 38 of the adjusting ring 31 so that the adjusting ring 31 is secured against relative rotation. The adjustment of this tripping moment of the ball-pocket coupling naturally takes place before the insert 10 is used for machining. The tripping moment is adjusted approximately so that it corresponds to about 60% of the breakage torque of the tap drill 11.

In the correct thread-cutting operation force transmission is effected through the drive dogs 16 of the drive sleeve 13 and passes to the coupling balls 20 through their mounting in the cage slots 23. From the coupling balls 20 force further is transmitted through the ball-pockets 25, in which the coupling balls 20 are mounted, to the drive shank 12 and thus to the tap drill rotably held therein.

If now for example the tap drill 11 runs against the bottom of the blind hole, for example as a result of defective depth setting or in the case of a core hole not drilled deep enough, the tap drill 11 stops rotating in the workpiece. A brake moment on the drill opposes the drive torque. If the brake moment is greater than the pre-set tripping moment of the ball-pocket coupling 19, then uncoupling automatically takes place between drive sleeve 13 on the one hand and drive shank 12 with tap drill 11 on the other. The ball-pocket coupling 19 responds. In this response the coupling balls 20 are lifted over the contact section 54 out of the ball-pockets 25 within the diametric plane. In this action the basis is to be adopted that the drive shank 12 is stationary in relation to the drive sleeve 13 which is still loaded with the drive moment in the direction of the arrow 18. The contact section 54 then pushes the coupling balls 20 before it within the diametric plane against the spring loading of the thrust ring 29. The coupling balls 20 here remain in contact with the contact section 54, then roll over the transition edge between contact section 54 and wall 50 and then roll outwards along the wall 50 in the cage slot 23 in the direction towards the annular groove 28 of the closure sleeve 26 until the coupling balls 20 are forced completely out of the ball-pockets 25 and abut substantially on both walls 50, 51 of the cage slots 23 and in the radial direction on the bottom of the annular groove 28, as shown in FIG. 3b. In this position the ball center points lie on the bisectors 56. The coupling balls 20 are situated completely outside the ball-pockets 25. A corresponding axial displacement of the thrust ring 29 against the action of the thrust springs 30 is superimposed upon this outward movement of the coupling balls 20. In the outward travel of the coupling balls 20 they slide from the frustoconical thrust face 60 gradually towards the plane retaining face 61 of the thrust ring 29. In the completely uncoupled condition according to FIG. 1 on the left and FIG. 3b the thrust ring 29 is now pressed with greater spring force, as a result of the greater compression of the thrust springs 30, with its plane-retaining face 61 axially against the disengaged coupling balls 20.

The coupling balls 20 are held stably in this uncoupled position. This takes place firstly by reason of the oblique placing of the walls 50 and 51 towards the working drive direction according to the arrow 18, for in the case of continuing drive movement of the drive sleeve 13 the latter pushes the disengaged coupling balls 20 by the wall 50 before it in the peripheral direction. The coupling balls 20 then roll on the peripheral surface 24 of the drive shank 12 and within the annular groove 28. The wall 50 placed at an inclination towards the drive direction thus endeavours to hold the coupling balls 20 in the uncoupled position (FIG. 3b) in the radial direction and to push them still further outwards. Self-effected dropping back of the coupling balls from the uncoupled position into the coupled position is thus reliably prevented, even if the counter-moment lying above the tripping moment does not prevail. This stable condition is supported by the plane-retaining face 61 of the thrust ring 29 which presses in the axial direction upon the coupling balls 20 and has no component in the radial direction, so that the coupling balls 20 are likewise held stably in the uncoupled position by means of the retaining face 61. The passage from the coupled to the uncoupled condition of the coupling balls 20 takes place substantially suddenly. This is firstly on mainly due to the sudden transition of the contact section 54 into the oblique wall 50 and also on account of the sudden transition of the frustoconical thrust face 60 of the thrust ring 29 into the plane-retaining face 61. Thus on tripping of the ball-pocket coupling 19 the tripping movement takes place suddenly and quickly and does not proceed gradually.

The ball-pocket coupling 19 is set back into the coupled condition (FIG. 1 on the right, FIGS. 3a, 4 and 5) when a contrary torque directed against the arrow 18 is exerted upon the drive sleeve 13, for example by reversal of direction of rotation of the machine. With such movement each coupling ball 20 is set back again positively in an approximately radial direction into the ball-pocket 25 as a result of the oblique wall 51 now inclined in the reverse direction of rotation. In the return movement the coupling ball 20 travels from the plane-retaining face 61 to the frustoconical thrust face 60 by which then, on account of the radial component resulting from the inclination of this thrust face 60, the return movement of the coupling balls 20 into the ball-pockets 25 is promoted. This return movement therefore takes place likewise suddenly and rapidly. The inclined wall 51 ensures in this return movement that here a positive entraining of the drive shank 12 with tap drill 11 takes place. This is necessary because in the return rotation the tap drill 11 must be screwed out of the cut threaded hole, without destroying the latter. Thus the torque limitation achieved by the ball-pocket coupling 19 is effective exclusively when the drive direction corresponds to the direction of rotation according to the arrow 18. In oppositely directed return movement the torque coupling is without function.

The arrangement is simple in assembly and therefore cheap and operationally reliable. It renders possible a precise and reproducible response of the ball-pocket coupling 19 for torque limitation. As a result in the uncoupled condition the friction wear is extraordinarily low. Substantially only rolling friction is present. The spring forces to be applied by the thrust springs 30 can be kept small. The arrangement permits very small axial and radial dimensions. In the disengaged and uncoupled condition the coupling balls 20 remain reliably and securely in the disengaged position in which they completely release the drive shank 12 in relation to the still driven drive sleeve 13. The possibility of the disengaged coupling balls 20 briefly re-entering the ball-pocket 25 and having to be pushed out of it again every time when in the rotational drive movement of the drive sleeve 13 in the direction of the arrow 18 a cage slot 23 with coupling ball 20 passes a ball-pocket 25 in the drive shank 12, is precluded. Thus the possibility of occurrence of impact-type loading of the tap drill 11 is completely precluded. A sudden shift from the coupled condition to the uncoupled condition is achieved by the transition from the contact section 54 abutting tangentially on the coupling ball 20 in the coupled condition into the inclined wall 50 of the cage slots 23 and by the transition from the frustoconical thrust face 60 of the thrust ring 29 into the plane-retaining face 61. Thus the tripping of the ball-pocket coupling 19 takes place abruptly and not gradually. In reverse rotation of the drive sleeve 13, opposite the direction of the arrow 18, setting back of the coupling balls 20 into the coupled condition is achieved positively and likewise abruptly by means of the wall 51. This also ensures that the ball-pocket coupling 19 is securely out of operation in this reverse rotation and then the rotational drive movement of the tap drill 11 takes place positively.

It is self-evident that the overload coupling device can also be constructionally integrated directly into a quick-change thread-cutter chuck.

In an embodiment of the invention which is not illustrated the walls 50, 51 of the cage slots 23, instead extending parallel with the longitudinal central axis 21 and being planar in the axial direction, can also have an inclined course in this direction. In place of the contact section 54 abutting tangentially on the coupling balls 20 only a narrow edge can be provided equally in the corner region, which expediently then lies directly adjacent to the outer marginal edge of the ball-pocket 25, thus this region is in approximately point contact with the outer surface of the coupling balls 20.

I claim:

1. An overload coupling device for thread-cutter - chucks, quick-change inserts therefor, and the like, said device comprising a cylindrical sleeve loadable with the rotational drive moment; a drive shank drivable by means of the drive sleeve and held coaxially and rotatably within the latter, said shank having a mounting for the rotation-fast retention of a tap drill; a torque coupling with adjustable tripping torque seated in the force-transmission parts between drive sleeve and drive shank, said coupling being formed as spring-loaded ball-pocket coupling with at least one coupling ball, the drive sleeve being axially non-displaceably held on the drive shank and provided with at least one opening open in the axial direction on one axial end face and serving for the reception of said coupling ball, the angular width of said opening being at least as great as the coupling ball diameter, the drive shank in the axial region of the opening comprises a ball-pocket of a diameter smaller than the diameter of the coupling ball for the reception of the coupling balls, said opening being formed as cage slots which are inwardly and outwardly open in the radial direction and the axial extent of which is less than the coupling ball diameter, the cage slots being inclined toward the working drive direction of the drive sleeve, the ball-pockets being arranged on the outer peripheral surface of the drive shank facing the drive sleeve; a cylindrical closure sleeve coaxially enclosing the drive sleeve and the drive shank being axially non-displaceably held on the drive sleeve and possessing in the axial region of the cage slots in the interior an annular groove the bottom of which extends at a radial distance corresponding at least to the coupling ball diameter from the peripheral surface of the drive shank; and in the annular space between drive shank and closure sleeve on the axial side of the coupling balls remote from the bottom of the cage slots a thrust ring which is pressable axially in the direction towards the cage slots and against the coupling balls by means of thrust springs adjustably supported on the closure sleeve the two mutually opposite walls of each cage slot considered in a diametric plane at right angles to the longitudinal central axis each extending along a secant of the peripheral circle of the drive shank and of the drive sleeve and parallel to and with spacing from a diameter of said peripheral circle.

2. An overload coupling device according to claim 1, in which the projection of the slot width of each cage slot upon the peripheral surface of the drive shank, when the coupling ball is situated in the associated ball-pocket, is offset in the peripheral direction in the working drive direction of the drive sleeve in relation to the associated ball-pocket in such a way that one of the walls of the cage slot is spaced from the coupling ball and out of contact with it and the opposite wall of this cage slot abuts on the coupling ball with a narrow corner region closely adjacent to the ball-pocket.

3. An overload coupling device according to claim 2, in which the corner region has a contact section abutting tangentially on the coupling ball and approximately parallel with the diameter which intersects the longitudinal central axis and contains the centre point of the coupling ball.

4. An overload coupling device according to claim 2, in which the corner region lies on a peripheral circle which is larger than the peripheral circle describing the outer peripheral surface of the drive shank and on which the centre points of the coupling balls situated in the associated ball-pockets, approximately lie.

5. An overload coupling device according to claim 1, in which the bisector of the slot width of a cage slot, which extends parallel with the walls of a cage slot, extends with spacing from the ball center point in the working drive direction when the coupling ball is situated in the associated ball-pocket, and in which when the coupling ball has travelled out of the associated ball-pocket the ball centre point lies on the bisector.

6. An overload coupling device according to claim 1, in which the angle included between a diameter, which intersects the longitudinal central axis and contains the ball centre point of a coupling ball, and a wall of the cage slot is an acute angle.

7. An overload coupling device according to claim 1, in which the slot width, measured at right angles to two mutually opposite walls of a cage slot, seen in a diametric plane, corresponds approximately to the diameter of a coupling ball.

8. An overload coupling device according to claim 1, in which the end face, facing the coupling balls, of the thrust ring, has a frustoconical inner thrust face with cone apex directed contrarily of the thrust direction and in that the frustoconical thrust face merges at the end face of the thrust ring facing the coupling balls into a plane retaining face at right angles to the longitudinal central axis.

9. An overload coupling device according to claim 8, in which the thrust ring is resiliently pressable against the coupling balls by means of the thrust springs with its frustoconical thrust face when the coupling balls are situated in the ball-pockets and with its retaining face when the coupling balls have travelled radially out of the ball-pockets.

10. An overload coupling device according to claim 1, in which the drive sleeve comprises preferably two mutually diametrically opposite, axially protruding drive dogs on its end face remote from the cage slots.

11. An overload coupling device according to claim 1, in which the drive sleeve is axially non-displaceably held on the drive shank in an axial direction opposite to the thrust direction of the thrust springs by means of an inner annular collar protruding radially of the drive shaft, and in which the closure sleeve in turn is held axially non-displaceably in the same direction on the drive sleeve by means of an approximately corresponding radial annular collar.

12. An overload coupling device according to claim 1, in which on the end of the closure sleeve remote from the drive sleeve, in the annular space between the closure sleeve and the drive shank, an adjusting ring is arranged which is screwed by means of external threading into an internally threaded section of the closure sleeve and held non-rotatably in relation to the closure sleeve by means of a rotation-securing device, and in which as thrust springs there are provided dished springs which are arranged in the annular space between closure sleeve and drive shank and clamped in the axial direction between thrust ring and adjusting ring according to the rotational position of the latter.

13. An overload coupling device according to claim 12, in which the rotation-securing device comprises an annular spring held in a peripheral groove of the closure sleeve and having an end bent over into the radial direction which engages with the adjusting ring through a radial passage opening of the closure sleeve, and also on the outer periphery of the adjusting ring a plurality of axial longitudinal slots open towards the periphery and provided at equal angular intervals from one another in the peripheral direction, in which slots the end of the annular spring engages in securing manner.

14. An overload coupling device according to claim 1, in which the thrust ring is held non-rotatably but axially displaceably and radially centred in relation to the drive shank.

15. An overload coupling device according to claim 14, in which the thrust ring has on its inner peripheral surface preferably three axial grooves arranged at equal angular intervals from one another in the peripheral direction, in each of which grooves a retaining and centring ball engages which is held on the drive shank in an associated depression of the outer peripheral surface.

16. A coupling comprising:
a driven member rotatable in a predetermined forward rotational sense about a rotation axis and formed with at least one radially outwardly open pocket;
a driving member having a portion radially surrounding said driven member at said pocket and rotatable about said axis relative to said driven member while being axially nondisplaceable relative to said driven member, said driving member having at least one axially open slot radially alignable with said pocket and having a predetermined axial depth;
a sleeve surrounding said driving member at said pocket;
a ball in said slot and having a diameter greater than said predetermined axial depth, said ball being radially displaceable between a coupling position engaged in said slot and in said pocket and a decoupling position engaged in said slot and with said sleeve and clear of said pocket, whereby said members are rotationally coupled with said ball in said coupled position and decoupled with said ball in said decoupled position;
a thrust ring axially aligned with said portion and having a frustoconical end surface tapered axially away from said driving member and engageable with said ball at least in said coupled position; and
spring means biasing said thrust ring axially for urging said ball radially with said frustoconical surface into said pocket and hence into said coupled position with a predetermined spring force.

17. The coupling defined in claim 16 wherein said driven member is formed with a plurality of such pockets angularly equispaced about said axis, said driving member being formed with a corresponding plurality of such slots angularly equispaced about said axis, said coupling including one such ball in each of said slots.

18. The coupling defined in claim 16 wherein said sleeve is formed at the level of said pocket with a radially inwardly open groove, said ball being engageable in said groove in said decoupled position, said slot having a radial dimension smaller than said diameter of said ball.

19. The coupling defined in claim 16 wherein said coupling has formations on said members and said sleeve preventing relative axial displacement thereof.

20. The coupling defined in claim 16 wherein said spring means includes springs bearing axially on said sleeve and on said thrust ring.

21. The coupling defined in claim 16 wherein said driven member is provided with a mounting for a tool at said axis.

22. The coupling defined in claim 16 wherein said pocket is part-spherical.

23. A coupling comprising:
a driven shank rotatable in a predetermined forward rotational sense about a rotation axis and formed with at least one radially outwardly open pocket;
mounting means on said driven shank for holding a rotary tool at said axis;
a drive sleeve radially surrounding said driven shank at said pocket and rotatable about said axis relative to said driven shank while being axially nondisplaceable relative thereto, said drive sleeve being formed with at least one axially open slot radially alignable with said pocket and having a base surface lying substantially in a plane perpendicular to said axis and relative to said forward rotational sense a leading axially extending flank and a trailing axially extending flank, said leading flank being inclined into said forward rotational sense and having relative thereto an inner leading edge and an outer trailing edge, whereby rotation of said drive sleeve about said axis in a reverse rotational sense opposite to said forward rotationl sense cams said ball radially inwardly with said leading edge, said slot having a predetermined axial depth;
a coupling ball in said slot having a diameter greater than said axial depth and being displaceable in said slot between a radially inner coupling position engaged in said pocket and a radially outer decoupling position clear of said pocket, whereby said sleeve and said shank are rotationally coupled with said ball in said coupled position and are decoupled with said ball in said decoupled position;
a thrust ring axially aligned with said sleeve and having an end axially engageable with said ball, said end being subdivided into a radially inner frustoconical surface tapered away from said drive sleeve and engageable with said ball only in said coupled position and extending radially outwardly from said inner surface and outer surface substantially parallel to said base surface and engageable with said ball only in said decoupled position; and
spring means biasing said thrust ring axially for pressing said ball in said coupled position radially with said frustoconical inner surface into said pocket and in said decoupled position for pressing said ball with said outer surface against said base surface of said slot.

24. The coupling defined in claim 23, further comprising a closure sleeve surrounding said drive sleeve and thrust ring at said pocket and formed at said pocket with a radially inwardly open groove, said ball being engaged in said groove in said decoupled position.

25. The coupling device defined in claim 23 wherein said trailing flank of said slot has a radially inner planar portion extending parallel to a plane including said axis and passing through the center of said ball and a radially outer planar portion generally parallel to said leading flank of said slot, said ball engaging said inner portion only in said coupling position and engaging said outer portion only in said decoupled position.

26. The coupling defined in claim 23 wherein said trailing flank of said slots extends mainly parallel to said leading flank of said slot and at an acute angle to a plane including said axis and passing generally through the center of said ball.

27. The coupling defined in claim 23 wherein said trailing surface of said slot extends mainly parallel to said leading flank of said slot and is spaced from said leading flank in a direction perpendicular to said leading and trailing flanks by a distance greater than said diameter of said ball.

28. The coupling defined in claim 23, further comprising means for rotationally linking said thrust ring to said drive shank.

29. The coupling defined in claim 23, further comprising means for varying said predetermined spring force.

* * * * *